Feb. 3, 1942.   M. F. KENT   2,271,981
DYNAMOELECTRIC MACHINE
Filed Nov. 8, 1940
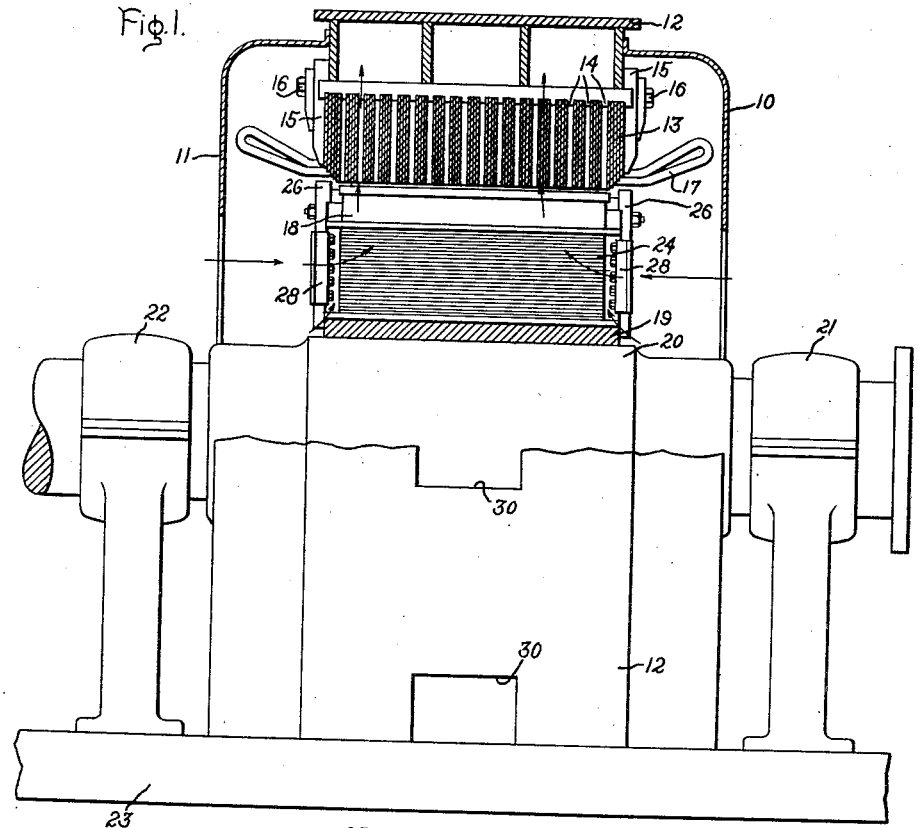
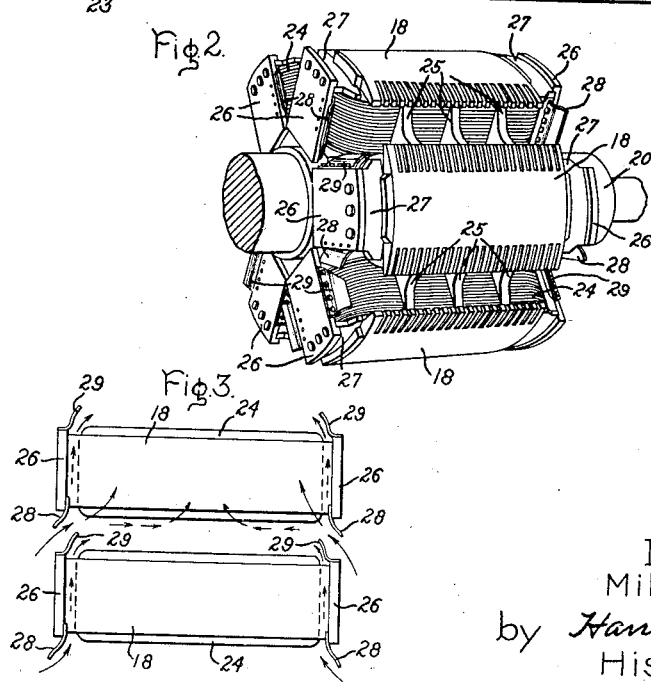
Inventor:
Milton F. Kent,
by Harry E. Dunham
His Attorney.

Patented Feb. 3, 1942

2,271,981

UNITED STATES PATENT OFFICE 2,271,981

DYNAMOELECTRIC MACHINE

Milton F. Kent, Schenectady, N. Y., assignor to General Electric Company, a corporation of New York Application November 8, 1940, Serial No. 364,827

6 Claims. (Cl. 171—252)

My invention relates to improvements in dynamo-electric machines and more particularly to an improved ventilating system for such machines.

An object of my invention is to provide an improved ventilating or cooling system for dynamo-electric machines.

Further objects and advantages of my invention will become apparent and my invention will be better understood from the following description referring to the accompanying drawing, and the features of novelty which characterize my invention will be pointed out with particularity in the claims annexed to and forming part of this specification.

In the drawing, Fig. 1 is a side elevational view, partly in section, illustrating a dynamo-electric machine embodying my improved ventilating arrangement; Fig. 2 is a perspective view of the rotatable member of the machine shown in Fig. 1; and Fig. 3 is a schematic illustration of the rotatable member shown in Figs. 1 and 2 illustrating the path of the ventilating medium about this member.

Referring to the drawing, I have shown a dynamo-electric machine such as a synchronous motor or generator provided with a stationary member having a frame or casing including two end shields 10 and 11 secured to a main supporting frame 12 arranged about a core 13 formed of laminations of magnetic material. The laminations of the core 13 are assembled together with spacers arranged at axially spaced apart intervals to provide axial ventilating passages 14 therethrough. End plates 15 arranged at each end of the laminated core 13 retain the laminations in assembled relationship and are secured together by through bolts 16. A winding 17 is arranged in winding slots formed in the laminated core 13 and is adapted to react electrodynamically with the rotatable member of the machine. This rotatable member includes a plurality of circumferentialy spaced apart salient pole pieces 18 secured to a core 19 mounted upon a shaft 20 which is rotatably supported in pedestal bearings 21 and 22 upon a base 23. These pole pieces 18 are adapted to be excited magnetically by field exciting windings 24 arranged about the sides of the pole pieces. In large machines such as the one illustrated in the drawing, braces 25 are arranged in the interpolar spaces to assist in holding the sides of the winding 24 in position on the pole pieces, and end plates 26 are secured to the core 19 and to the pole pieces 18 and are provided with bridges or bracing elements 27 further to assist in retaining the upper ends of the coils 24 in position. These end plates are axially spaced from the winding 24 to provide a passage between the ends of the windings and the plates, so that a ventilating medium may pass therethrough to help in cooling this portion of the field exciting winding. Intake vanes 28, which are curved outwardly, are secured to the inner side of the leading edges of the end plates 26 in order to assist in directing ventilating medium into the interpolar spaces and into the spaces between the end plates 26 and the windings 24 at the ends of the pole pieces to cool the field exciting windings. Exhaust vanes 29 are secured to the trailing edges of the end plates 26 and are arranged to direct the ventilating medium from adjacent the ends of the windings 24 from between the windings and the end plates 26 into the interpolar spaces with a minimum of interference with the ventilating medium directed thereinto by the intake vanes of the next adjacent pole pieces.

The arrows on Figs. 1 and 3 indicate generally the flow of ventilating medium through the rotatable member of the machine when it is in operation. Furthermore, the circumferentially spaced apart pole pieces act as the impeller elements of a centrifugal fan and assist in impelling the ventilating medium therein radially out through the radial ventilating passages 14 of a stationary member. Such an arrangement provides for the efficient cooling of the rotatable member of a dynamo-electric machine, and also for cooling the stationary member of the machine. Openings 30 are formed in the frame 12 so that the ventilating medium may be exhausted from the casing to the atmosphere after it has passed through the radial passages 14. The double vane construction as illustrated provides for the impelling and directing of ventilating medium into the interpolar spaces on each side of each of the salient pole pieces without appreciable interference between ventilating medium which flows therein from adjacent pole pieces. I have found in particular that the exhaust vanes 29 in this arrangement very materially increase its ventilating efficiency and provide a very inexpensive and improved ventilating system.

While I have illustrated and described a particular embodiment of my invention, modifications thereof will occur to those skilled in the art. I desire it to be understood, therefore, that my invention is not to be limited to the particular arrangement disclosed, and I intend in the appended claims to cover all modifications which do not depart from the spirit and scope of my invention.

What I claim as new and desire to secure by Letters Patent of the United States is:

1. A dynamo-electric machine having a stationary member and a rotatable member provided with salient pole pieces, windings on said pole pieces, and means adjacent the ends of said pole pieces extending outwardly at the leading edges of said pole pieces and extending inwardly at the trailing edges of said pole pieces for directing a ventilating medium into contact with the ends of said windings and into the interpolar spaces on each side of said pole pieces without appreciable interference of ventilating medium flow from means on adjacent pole pieces.

2. A dynamo-electric machine having a stationary member and a rotatable member provided with salient pole pieces, windings on said pole pieces, means on the leading edges of the sides of said pole pieces for directing a ventilating medium into contact with the ends of said windings and into the interpolar spaces, and means on the trailing edges of the sides of said pole pieces for directing the ventilating medium from adjacent the ends of said windings into the interpolar spaces.

3. A dynamo-electric machine having a stationary member provided with radial ventilating passages therethrough and a rotatable member having salient pole pieces, windings on said pole pieces, and means including vanes on the leading and vanes on the trailing edges of the sides of said pole pieces for directing a ventilating medium into contact with the ends of said windings and into the interpolar spaces and out through said stationary member ventilating passages.

4. A dynamo-electric machine having a stationary member and a rotatable member provided with circumferentially spaced apart salient pole pieces, windings on said pole pieces, end plates on said pole pieces mounted thereon in spaced relation from the ends of said windings, means on the leading edges of said end plates for directing a ventilating medium into the space between said end plates and said windings and into the interpolar spaces, and means on the trailing edges of said end plates for directing the ventilating medium from the space between said end plates and said windings into the interpolar spaces.

5. A dynamo-electric machine having a stationary member and a rotatable member provided with salient pole pieces, windings on said pole pieces, end plates on said pole pieces mounted thereon in spaced relation from the ends of said windings, and means including an intake vane on the leading edges of said end plates for directing a ventilating medium into the space between said end plates and said windings and into the interpolar spaces and an exhaust vane on the trailing edges of said end plates for directing the ventilating medium from the space between said plates and said windings into the interpolar spaces.

6. A dynamo-electric machine having a stationary member provided with radial ventilating passages therethrough and a rotatable member having circumferentially spaced apart salient pole pieces, windings on said pole pieces, means including intake vanes on the leading edges of said pole pieces for directing a ventilating medium into contact with the ends of said windings and into the interpolar spaces and exhaust vanes on the trailing edges of said pole pieces for directing the ventilating medium from adjacent the ends of said windings into the interpolar spaces with a minimum of interference with the ventilating medium directed thereinto by said intake vanes.

MILTON F. KENT.